United States Patent
Lee et al.

(10) Patent No.: US 9,503,792 B2
(45) Date of Patent: Nov. 22, 2016

(54) DISPLAY APPARATUS AND METHOD OF SETTING UP CHANNEL OF THE SAME

(71) Applicant: SAMSUNG ELECTRONICS CO., LTD., Suwon-si, Gyeonggi-do (KR)

(72) Inventors: Yui-yoon Lee, Busan (KR); Sang-min Lim, Yongin (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 42 days.

(21) Appl. No.: 14/307,703

(22) Filed: Jun. 18, 2014

(65) Prior Publication Data

US 2015/0046950 A1    Feb. 12, 2015

(30) Foreign Application Priority Data

Aug. 8, 2013   (KR) .................. 10-2013-0094293

(51) Int. Cl.
| | |
|---|---|
| H04N 5/50 | (2006.01) |
| H04N 21/485 | (2011.01) |
| H04N 5/46 | (2006.01) |
| H04N 21/438 | (2011.01) |
| H04N 21/462 | (2011.01) |
| H04N 21/422 | (2011.01) |
| H04N 5/445 | (2011.01) |

(52) U.S. Cl.
CPC ............. *H04N 21/485* (2013.01); *H04N 5/46* (2013.01); *H04N 5/50* (2013.01); *H04N 21/42224* (2013.01); *H04N 21/4383* (2013.01); *H04N 21/4622* (2013.01); *H04N 2005/44517* (2013.01); *H04N 2005/44556* (2013.01)

(58) Field of Classification Search
CPC .... H04N 5/50; H04N 5/4401; H04N 5/4403; H04N 5/46; H04N 5/44582; H04N 2005/44517; H04N 2005/44556; H04N 21/485; H04N 21/47; H04N 21/42224
USPC ................ 348/731–733, 734; 725/59, 37, 48
IPC ................................................. H04N 5/50, 5/44
See application file for complete search history.

(56) References Cited

U.S. PATENT DOCUMENTS

| | | | |
|---|---|---|---|
| 4,776,038 A | 10/1988 | Testin et al. | |
| 6,400,422 B1 * | 6/2002 | Nakamura | H04N 5/50 348/553 |

(Continued)

FOREIGN PATENT DOCUMENTS

| | | |
|---|---|---|
| KR | 10-2006-0069217 | 6/2006 |
| WO | 2009/016475 A2 | 2/2009 |

OTHER PUBLICATIONS

Extended European Search Report dated Dec. 22, 2014 in corresponding European Patent Application No. 14170644.0.

*Primary Examiner* — Sherrie Hsia
(74) *Attorney, Agent, or Firm* — Staas & Halsey LLP

(57) ABSTRACT

Disclosed are a display apparatus and a method of setting up a channel of the same. The method includes receiving a channel retrieval request on a setting screen displayed on the display apparatus, retrieving a determined frequency band corresponding to the received channel retrieval request, and selecting one of a terrestrial broadcasting mode and a cable broadcasting mode in response to a retrieval result. Thus, automatically retrieving a frequency band corresponding to one connected broadcasting mode of a terrestrial broadcasting mode and a cable broadcasting mode is possible.

17 Claims, 10 Drawing Sheets

(56) References Cited

U.S. PATENT DOCUMENTS

| | | | | |
|---|---|---|---|---|
| 6,734,804 B1* | 5/2004 | Lee | H03J 1/0008 | |
| | | | 340/13.22 | |
| 7,876,383 B2* | 1/2011 | Seo | H04N 5/44 | |
| | | | 348/555 | |
| 8,358,382 B2* | 1/2013 | O'Donnell | H04N 5/50 | |
| | | | 348/558 | |
| 8,508,665 B2* | 8/2013 | Lee | H04N 21/4382 | |
| | | | 348/569 | |
| 2004/0031050 A1 | 2/2004 | Klosterman | | |
| 2006/0290775 A1 | 12/2006 | Horii et al. | | |
| 2010/0313222 A1* | 12/2010 | Lee | H04N 5/44513 | |
| | | | 725/50 | |

* cited by examiner

DISPLAY APPARATUS AND METHOD OF SETTING UP CHANNEL OF THE SAME

CROSS-REFERENCE TO RELATED APPLICATIONS

This application claims priority from Korean Patent Application No. 10-2013-0094293, filed on Aug. 8, 2013 in the Korean Intellectual Property Office, the disclosure of which is incorporated herein by reference.

BACKGROUND

1. Field

Apparatuses consistent with the exemplary embodiments relate to a display apparatus and a method of setting up a channel of the same and, more particularly, to a display apparatus automatically setting up a broadcast channel corresponding to a connected coaxial cable and a method of setting up a channel of the same.

2. Description of the Related Art

In recent years, display apparatuses provide a wider range of services and functions to users. A terrestrial broadcasting mode and a cable broadcasting mode are generally provided to display apparatuses. When a user installs a display apparatus for the first time or moves a display apparatus, the user may select one of the terrestrial broadcasting mode and the cable broadcasting mode to set up a channel at home. As an increasing number of broadcast channels, such as satellite channels, are provided, it may take more time for a user to set up channels.

What is needed is an approach that simplifies setup/selection.

SUMMARY

The foregoing and/or other aspects may be achieved by providing a channel setup method of a display apparatus, the method including: receiving a channel retrieval request on a setting screen displayed on the display apparatus; retrieving a determined frequency band corresponding to the received channel retrieval request; and selecting one of a terrestrial broadcasting mode and a cable broadcasting mode in response to a retrieval result.

The receiving the request may receive the request from one of a touch pad on a remote controller, a key on the remote controller, a touch screen on the display apparatus and a panel key on the display apparatus.

A frequency band of the terrestrial broadcasting mode and a frequency band of the cable broadcasting mode corresponding to the same channel number may be different.

The method may further include setting up a broadcast channel of one of the terrestrial broadcasting mode and the cable broadcasting mode in response to a channel selection.

The method may further include storing the set up channel.

The method may further include selecting the terrestrial broadcasting mode in response to the retrieval result when the frequency band ranges from 470 to 476 MHz corresponding to channel number 14.

The method may further include determining whether to supply power to the display apparatus for the first time, wherein the determining whether to supply power to the display apparatus is conducted using reference information pre-stored in a storage unit.

A broadcast may be received from one of an analog broadcasting system and a digital broadcasting system.

The foregoing and/or other aspects may be achieved by providing a channel setup method of a display apparatus, the method including: receiving a channel retrieval request on a setting screen displayed on the display apparatus; retrieving a frequency band ranging from 120 to 126 MHz corresponding to channel number 14; selecting a cable broadcasting mode when channel number 14 is retrieved within the frequency band; and setting up a channel of the cable broadcasting mode is provided.

The foregoing and/or other aspects may be achieved by providing a channel setup method of a display apparatus, the method including: receiving a channel retrieval request on a setting screen displayed on the display apparatus; retrieving a frequency band corresponding to channel number 14; selecting a terrestrial broadcasting mode when channel number 14 is retrieved within the frequency band; and setting up a channel of the terrestrial broadcasting mode, wherein the frequency band ranges 470 to 476 MHz is provided.

The foregoing and/or other aspects may be achieved by providing a channel setup method of a display apparatus, the method including: receiving a channel retrieval request on a setting screen displayed on the display apparatus; retrieving a channel number corresponding to a determined frequency band ranging from 470 to 478 MHz; selecting a terrestrial broadcasting mode when channel number 21 is retrieved within the frequency band; and setting up a channel of the terrestrial broadcasting mode According to an aspect of an exemplary embodiment, The method may further include selecting the terrestrial broadcasting mode when channel number 47 is retrieved within the frequency band, wherein the channel of the selected terrestrial broadcasting mode is set up.

The foregoing and/or other aspects may be achieved by providing a display apparatus including: a display unit to display an initial setting screen; a tuner; and a controller to control the display unit and the tuner unit, wherein the controller controls to electrically connect a power cord and a coaxial cable for broadcasting to the display apparatus, to connect the coaxial cable to the tuner, to retrieve a determined frequency band in response to a received channel retrieval request, and to display a set channel of one selected of a terrestrial broadcasting mode and a cable broadcasting mode on the initial setting screen is provided.

The display apparatus may further include a storage unit, and the controller may store channel information corresponding to the set channel in the storage unit.

The coaxial cable for broadcasting may be electrically connected via one of connection to the tuner and connection using a separate connector connected to the tuner.

As described above, one or more exemplary embodiments is to provide a display apparatus and a method of setting up a channel of the same which are capable of automatically retrieving a frequency band corresponding to one connected broadcasting mode of a terrestrial broadcasting mode and a cable broadcasting mode.

One or more exemplary embodiments is to provide a display apparatus capable of automatically retrieving a frequency band corresponding to one connected broadcasting mode of a terrestrial broadcasting mode and a cable broadcasting mode and selecting one of the terrestrial broadcasting mode and a cable broadcast channel, and a method of setting up a channel of the same.

One or more exemplary embodiments is to provide a display apparatus capable of automatically retrieving a frequency band corresponding to one connected broadcasting mode of a terrestrial broadcasting mode and a cable broadcasting mode and setting up a broadcast channel of one selected from the terrestrial broadcasting mode and a cable broadcast channel, and a method of setting up a channel of the same.

One or more exemplary embodiments is to provide a display apparatus provided with power for the first time, capable of automatically retrieving a frequency band corresponding to one connected broadcasting mode of a terrestrial broadcasting mode and a cable broadcasting mode and setting up a broadcast channel of one selected from the terrestrial broadcasting mode and a cable broadcast channel, and a method of setting up a channel of the same.

One or more exemplary embodiments is to provide a display apparatus capable of efficiently retrieving a frequency band corresponding to connected one broadcasting mode of a terrestrial broadcasting mode and a cable broadcasting mode and setting up a channel of the connected one broadcasting mode.

DETAILED DESCRIPTION

Figure 1:
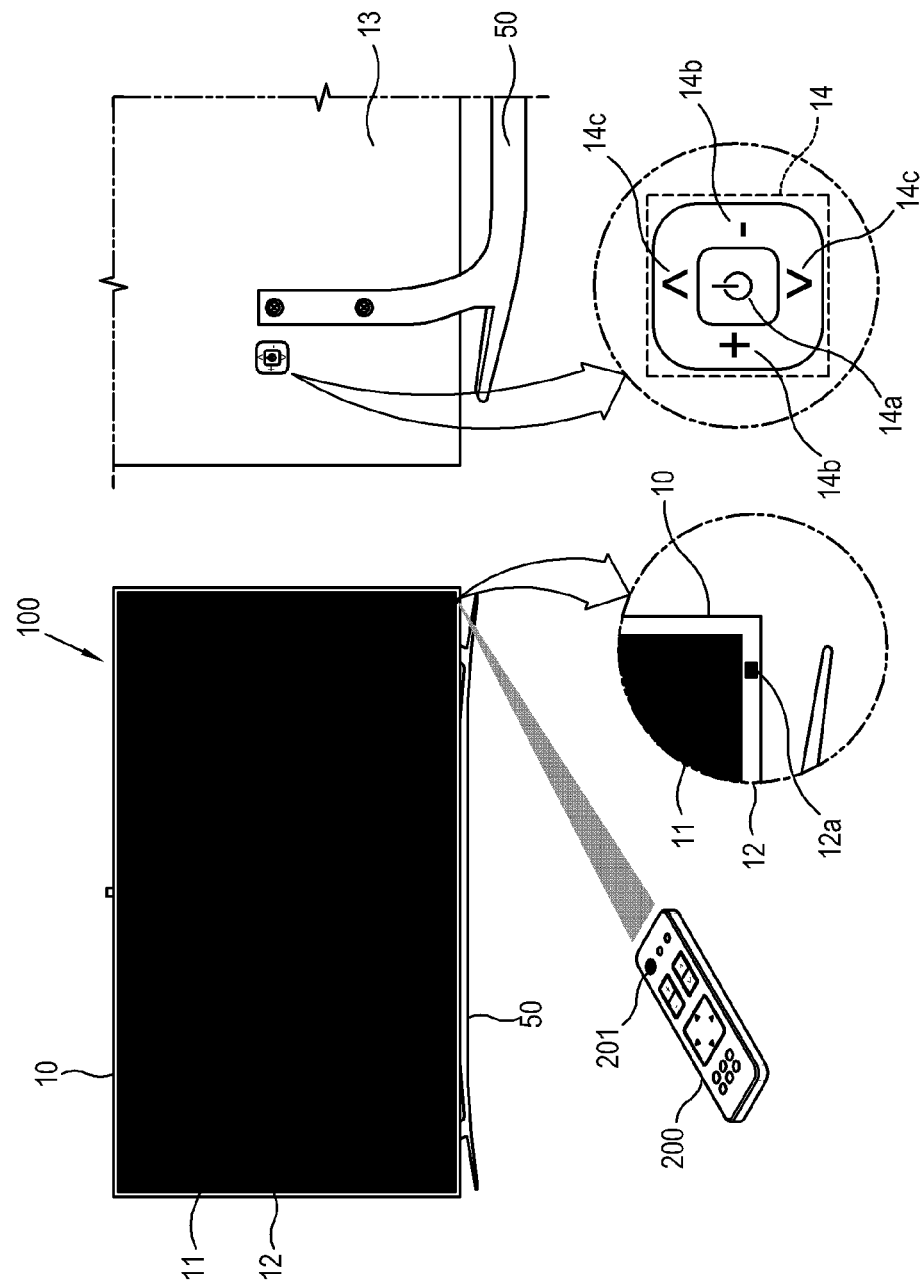
FIG. 1 is a front view schematically illustrating a display apparatus 100 according to an exemplary embodiment.

Below, exemplary embodiments will be described in detail with reference to the accompanying drawings. The exemplary embodiments may be embodied in various forms without being limited to the exemplary embodiments set forth herein. Like reference numerals refer to like elements throughout.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprise," "comprising," "include," "including," "have" and/or "having" when used in this specification, specify the presence of stated features, integers, steps, operations, elements, and/or components, but do not preclude the presence or addition of one or more other features, integers, steps, operations, elements, components, and/or groups thereof.

FIG. 1 is a front view schematically illustrating a display apparatus 100 according to an exemplary embodiment.

Referring to FIG. 1, the display apparatus 100 includes a main body 10 and a stand 50 to support the main body 50. Alternatively, the display apparatus 100 may include the main body 50 only without the stand 50.

The main body 10 includes a display unit (not shown) including a display panel 11 to display a video or image thereon, a front cover 12 and a rear cover 13 to support the display panel 11. The front cover 12 may include a light window 12a to receive light including ultraviolet light, visible light or infrared light, from an outside, for example, from a remote controller 200. The light window 12a may output light input from an inside of the display apparatus 100, for example, light emitted from a light emitting element, out of the display apparatus 100. The rear cover 13 may be connected to the stand 50. The rear cover 13 includes a panel key 14 on a portion of the rear cover 13 including a power key 14a, a volume key 14b and a channel key 14c. The panel key 14 may include a TV/external input key (not shown) or a menu key (not shown).

A remote controller 200 may be provided and may include one or more keys 201 and may infract with the light window 12a. The display apparatus 100 analyzes light received through the light window 12a to control an operation of the display apparatus 100. For example, the display apparatus 100 may conduct power control (on/off), volume adjustment, channel adjustment, muting, external input control, Internet search using a communication unit (not shown), letter input and implementation of stored content using an application.

Although FIG. 1 shows one light window 12a disposed on a bottom right side of the front cover 12, a plurality of light windows (not shown) may be provided. The light window 12a of the front cover 12 may be disposed on at least one of top, bottom, left and right portions of a front side of the front cover 12 where the display panel 11 is exposed to corresponding light input/output. Further, the light window 12a may be disposed at one of four lateral sides of the front cover 12, for example, corresponding to a thickness of the front cover 12.

The stand 50 may include a wall mount (not shown) to support the body 10 against a wall.

Figure 2:
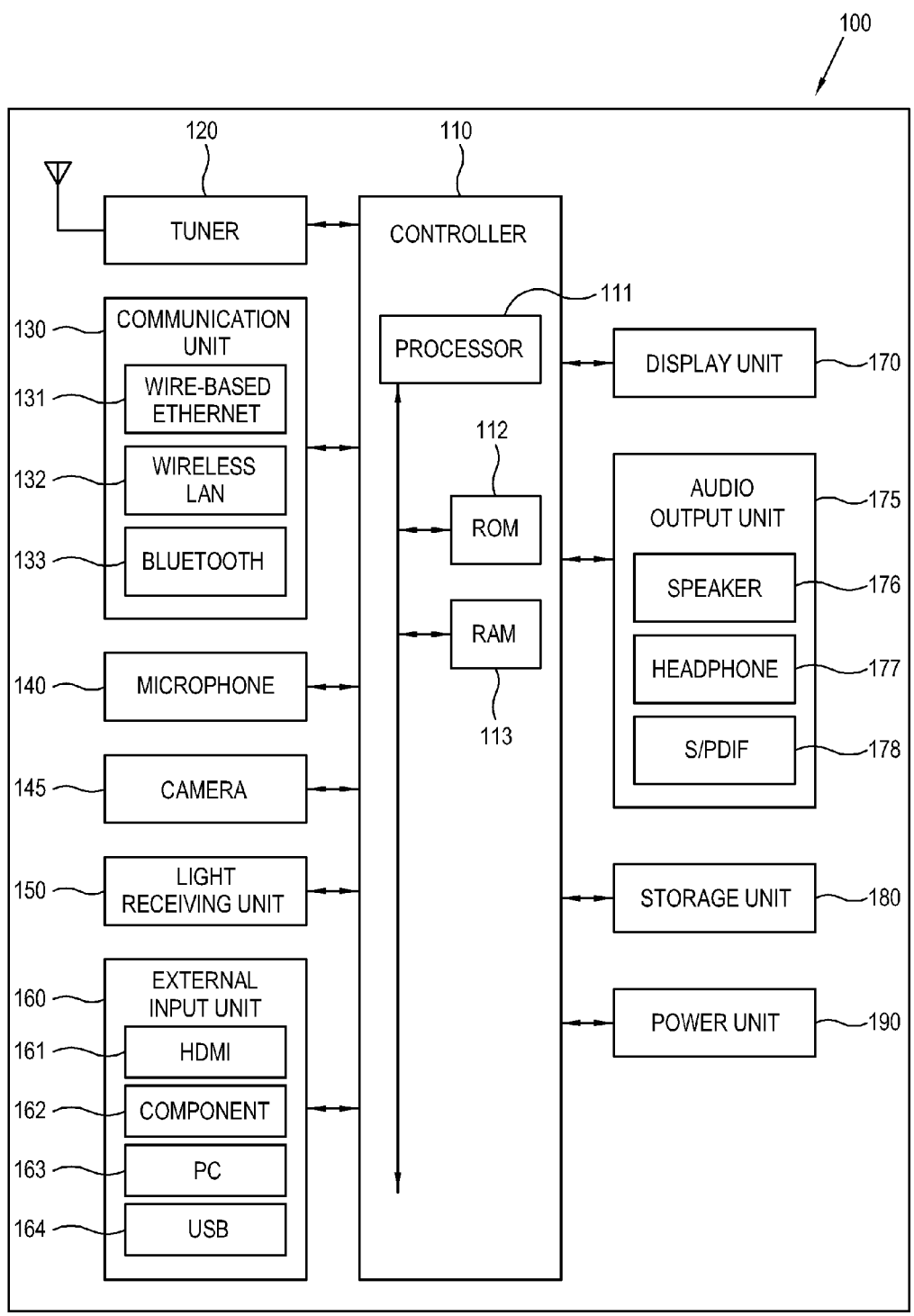
FIG. 2 is a block diagram illustrating the display apparatus according to an exemplary embodiment.

FIG. 2 is a block diagram illustrating the display apparatus according to an exemplary embodiment.

Referring to FIG. 2, the display apparatus 100 may be connected to an external device (not shown) via a cable or wirelessly using a communication unit 130 or an external input unit 160. The external device may include a mobile phone, a smartphone, a tablet PC and a server.

The display apparatus 100 may further include at least one of a tuner 120, the communication unit 130 and the external input unit 160 in addition to the display unit 170. The display apparatus 100 may be configured as an analog TV, a digital TV, a three-dimensional (3D), a smart TV, an LED TV, an OLED TV, a plasma TV and a monitor, without being limited thereto.

The display apparatus 100 includes the tuner 120, the communication unit 130, a microphone 140, a camera 145, a light receiving unit 150, the external input unit 160, the display unit 170, an audio output unit 175, a storage unit 180 and a power unit 190. The display apparatus 100 may include a sensor (not shown), for example, a luminance sensor and a temperature sensor, to detect internal or external circumstances of the display apparatus 100.

A controller 110 may include a processor 111, a read-only memory (ROM) 112 to store a control program for controlling the display apparatus 100 and a random-access memory 113 to store a signal or data input from the outside of the display apparatus 100 or to store various operations implemented in the display apparatus 100.

The controller 110 controls general operations of the display apparatus 100 and flow of signals between internal elements 120 to 190 of the display apparatus 100 and functions to process data. The controller 110 controls supply of power from the power unit 190 to the internal elements 120 to 180. Further, when a user input is made or a preset stored condition is satisfied, the controller 110 may execute an operating system (OS) or various applications stored in the storage unit.

The processor 111 may include a graphic processing unit (GPU) (not shown) to conduct graphic processing. The processor 111 may be provided as a system on chip (SOC) of a core (not shown) and the GPU. The processor 111 may include a single core, a dual core, a triple core, a quad core and multiple cores thereof. The processor 111 may include a plurality of processors, for example, a main processor (not shown) and a sub-processor (not shown) operating in a sleep mode in which the display apparatus 100 does not operate with power being supplied only. Further, the processor 111, the ROM 112 and the RAM 113 may be connected to each other via an internal bus.

In the present embodiment, the term "controller" includes the processor 111, the ROM 112 and the RAM 113.

The controller 110 of the present embodiment may control to connect a power cord and a coaxial cable for receiving a broadcast to the display apparatus 100, to retrieve a determined frequency band corresponding to a received channel retrieval request, and to select one of a terrestrial broadcasting mode and a cable broadcasting mode in response to a retrieval result.

The controller 110 may control reception of a channel retrieval request received from one of a touch pad of the remote controller 200, a key 201 of the remote controller 200, a touch screen of the display apparatus 100, and a key of the panel key 14 of the display apparatus 100.

The controller 110 may control the display apparatus 100 corresponding to a channel and a frequency band that vary based on a country and a broadcasting system, for example, an analog broadcasting system, a digital broadcasting system, the National Television System Committee (NTSC) and the Advanced Television Systems Committee (ATSC).

The controller 110 may conduct control such that the determined frequency band is determined as a frequency band of the terrestrial broadcasting mode corresponding to a predetermined channel number or a frequency band of the cable broadcasting mode corresponding to the predetermined channel number. The frequency band of the terrestrial broadcasting mode and the frequency band of the cable broadcasting mode corresponding to the same channel number are different.

The controller 110 may control to set up one of the terrestrial broadcasting mode and the cable broadcasting mode in response to a channel selection.

The controller 110 may control to store a set channel in the storage unit as channel information.

The controller 110 may control to select the terrestrial broadcasting mode in response to the retrieval result when the frequency band ranges from 470 to 476 MHz corresponding to channel number 14.

When power is input to the display apparatus 100, the controller 110 may determine whether power is input to the display apparatus 100 for the first time, which is carried out based on reference information pre-stored in the storage unit.

The controller 110 may control the display apparatus 100 to receive an analog broadcast from one of an NTSC broadcast system, a Phase Alternating Line (PAL) broadcast system and a Sequential Color with Memory (SECAM) broadcast system.

The controller 110 may control the display apparatus 100 to receive a digital broadcast from one of an ATSC broadcast system, an Integrated Services Digital Broadcasting-T (ISDB-T) broadcast system, a Digital Video Broadcasting-Terrestrial (DVB-T) broadcast system, a Digital Video Broadcasting-Terrestrial version 2 (DVB-T2) broadcast system, a Digital Video Broadcasting-Cable (DVB-C) broadcast system and a Digital Terrestrial Multimedia Broadcast (DTMB) broadcast system. Further, it should be understood by a person skilled in the art that the controller 110 may receive digital broadcasts through various digital broadcasting systems in addition to the foregoing digital broadcasting systems.

The controller 110 may receive a channel retrieval request and retrieve a frequency band ranging from 120 to 127 MHz corresponding to channel number 14 on a setting screen displayed on the display apparatus 100. When channel number 14 is retrieved from the frequency band, the controller 110 may select the cable broadcasting mode and set up a channel of the cable broadcasting mode.

The controller 110 may receive a channel retrieval request and retrieve a frequency band ranging from 470 to 476 MHz corresponding to channel number 14 on the setting screen displayed on the display apparatus 100. When channel number 14 is retrieved from the frequency band, the controller 110 may select the terrestrial broadcasting mode and set up a channel of the terrestrial broadcasting mode, wherein the frequency band may be controlled to 470 to 476 MHz.

The controller 110 may receive a channel retrieval request and retrieve a channel number corresponding to a determined frequency band ranging from 470 to 478 MHz on a setting screen displayed on the display apparatus 100. When channel number 21 is retrieved from the frequency band, the controller 110 may select the terrestrial broadcasting mode and set up a channel of the terrestrial broadcasting mode.

The controller 110 may select the terrestrial broadcasting mode and set up a channel of the terrestrial broadcasting mode when channel number 47 is retrieved from the frequency band.

When a coaxial cable for the terrestrial broadcasting mode is connected and the cable broadcasting mode 421b is selected by a user, the controller 110 may retrieve a determined frequency band and determine that the frequency band corresponds to the terrestrial broadcasting mode, not to the cable broadcasting mode.

The controller 110 may set up and store a channel of the terrestrial broadcasting mode corresponding to the determined terrestrial broadcasting mode.

When a coaxial cable for the cable broadcasting mode is connected and the terrestrial broadcasting mode 421c is selected by the user, the controller 110 may retrieve a determined frequency band and determine that the frequency band corresponds to the cable broadcasting mode, not to the terrestrial broadcasting mode.

The controller 110 may set up and store the terrestrial broadcasting mode corresponding to the determined terrestrial broadcasting mode.

The tuner 120 may conduct amplification, mixing or resonance on a broadcast signal received via a cable or wirelessly to tune and select only a frequency of a channel to be received by the display apparatus 100 among a plurality of radio wave components. The broadcast signal includes a video, an audio and data, for example, an electronic program guide (EPG). The tuner 120 may receive a video, an audio and data in a frequency band corresponding to a channel number, for example, cable channel 14, in accordance with a user input, for example, a channel number input and a channel up or down input on the remote controller 200 and a channel input on an EPG screen.

The tuner 120 may receive broadcast signals from various sources, such as terrestrial broadcasting, cable broadcasting, satellite broadcasting and an Internet broadcasting. The tuner 120 may receive broadcast signals from sources of analog broadcasting or digital broadcasting. The tuner 120 may be provided with the display apparatus 100 all in one or separately from the display apparatus 100.

The communication unit 130 may connect the display apparatus 100 to an external device, for example, a server, by control of the controller 110. The controller 110 may download an application or browse a web from the external device connected via the communication unit 130. The communication unit 130 may include at least one of wire-based Ethernet 131, a wireless local area network (LAN) 132 and Bluetooth 133 corresponding to a performance and structure of the display apparatus 100. Further, the communication unit 130 may include a combination of Ethernet 181, a wireless LAN 182 and Bluetooth 183.

The microphone 140 receives a voice uttered by the user. The microphone 140 may convert the received voice into an electric signal to output to the controller 110 and may be used for channel control. The microphone 140 may be provided with the display apparatus 100 all in one or separately from the display apparatus 100. The separate microphone 140 may be electrically connected to the display apparatus 100.

The camera 145 receives a video, for example, consecutive frames, obtained by photographing a motion of the user including a gesture. The camera 145 may convert the received video into an electric signal to output accordingly to control of the controller 110 and may be used for channel control. The camera 145 may include, for example, a lens and an image sensor. The camera unit 145 may be provided with the display apparatus 100 all in one or separately from the display apparatus 100. The separate camera 145 may be electrically connected to the display apparatus 100.

The light receiving unit 150 receives a light signal from the external remote controller 200 accordingly to control of the controller 110. For example, the light receiving unit 150 may receive a light signal, for example, a control signal corresponding to power-on of the display apparatus 100, generated by pressing or touching a key, for example, the power key 201, of the remote controller 200.

The external input unit 160 receives a video including a moving image and a picture, an audio including a voice and music, and data including a playback instruction from an outside of the display apparatus 100 accordingly to control of the controller 110. The external input unit 160 may include at least one of a high-definition multimedia interface (HDMI) input port 161, a component input jack 162, a PC input port 163 and a USB input jack 164.

The display unit 170 displays a video included in a broadcast signal received through the tuner 120 accordingly to control of the controller 110. The display unit 170 may display a video, for example, a moving image, input through the external input unit 160. The display unit 170 may display a voice UI, for example, including a voice instruction guide, for performing a voice recognition task or a motion UI, for example, including a motion guide, for performing a motion recognition task.

The audio output unit 175 outputs an audio included in a broadcast signal received through the tuner 120 accordingly to control of the controller 110. The audio output unit 175 may output an audio, for example, a voice and a sound, input through the external input unit 160. The audio output unit 175 may include at least one of a speaker 176, a headphone output terminal 177, and an S/PDIF output terminal 178. The audio output unit 175 may include a combination of the speaker 176, the headphone output terminal 177 and the S/PDIF output terminal 178.

The storage unit 180 may store various types of data, programs or applications for driving and controlling the display apparatus 100 accordingly to control of the controller 110. The storage unit 180 may store signals or data input or output corresponding to driving of the tuner 120, the communication unit 130, the microphone 140, the camera 145, the light receiving unit 150, the external input unit 160, the display unit 170, the audio output unit 175 and the power unit 190. The storage unit 180 may store control programs for controlling the display apparatus 100 and the controller 110, applications initially provided by a manufacturer or externally downloaded, a graphic user interface (GUI) associated with an application, an image for providing a GUI, user information, documents, databases or relevant data.

In the present embodiment, the term "storage unit" includes the storage unit 180, the ROM 112 and the RAM 113 of the controller 110, and a memory card (not shown), for example, a micro SD card and a USB memory, mounted on the display apparatus 100. The storage unit may include a nonvolatile memory, a volatile memory, a hard disk drive (HDD) and a solid state drive (SSD).

Although not shown, the storage unit 180 may include a broadcast reception module, a channel control module, a volume control module, a communication control module, a voice recognition module, a motion recognition module, a light reception module, a display control module, an audio control module, an external input control module, a power control module, a voice database (DB) and a motion DB. The modules and the DBs of the storage unit not shown may be configured as software for the display apparatus 100 to perform functions of broadcast reception control, channel control, volume control, communication control, voice recognition, motion recognition, light reception, display control, audio control, external input control and power control. The controller 110 may perform each function using software thereof stored in the storage unit.

The storage unit 180 may store a channel number and a frequency band corresponding to channel retrieval conducted using the tuner 120 according to control of the controller 110. The storage unit 180 may store channel numbers and frequency bands of analog broadcasts received from the NTSC broadcast system, the PAL broadcast system or the SECAM broadcast system or digital broadcasts received from the ATSC, the ISDB-T, the DVB-T, the DVB-T2, the DVB-C or the DTMB broadcast system corresponding channel retrieval conducted using the tuner 120.

The storage unit 180 may reference information corresponding to whether power is supplied to the display apparatus 100 for the first time. The reference information is referred to as out-of-box information. The reference information has a flag form and may be set at manufacture. That the reference information is set means that power is supplied for the first time. The controller 110 may clear the reference information stored in the storage unit after referring to the information at first.

The storage unit 180 may store at least one initial setting screen, for example, a graphical user interface (GUI), corresponding to an initial setting corresponding to a case that power is supplied to the display apparatus 100 for the first time using the reference information. The initial setting screen may include a plurality of pages.

The storage unit 180 may store a channel setting corresponding to one of the terrestrial broadcasting mode and the cable broadcasting mode as channel information.

The power unit 190 supplies power from an external power source to the internal components 120 to 180 of the display apparatus 100 accordingly to control of the controller 110. The power unit 190 may supply power to one or at least two batteries (not shown) disposed in the display apparatus 100. The batteries may be disposed between the display unit 170 and the rear cover 13. Alternatively, the batteries may be disposed on the front cover 12 of the display apparatus 100.

At least one component may be added to or deleted from the components of the display apparatus 100 shown in FIGS. 1 and 2 based on the performance of the display apparatus 100. Also, it should be understood by a person skilled in the art that positions of the components may be changed corresponding to the performance or structure of the display apparatus 100.

Figure 3:
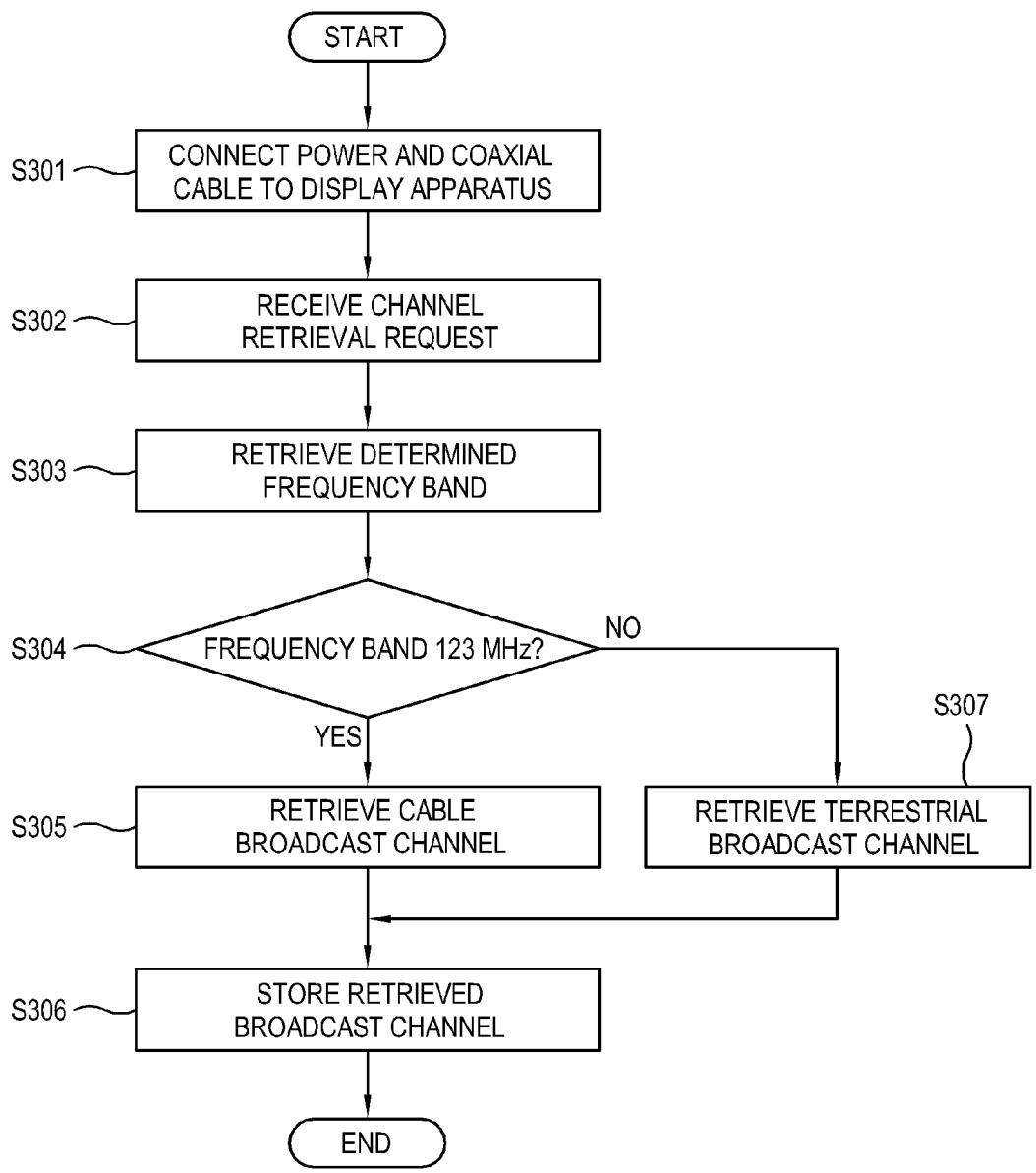
FIG. 3 is a flowchart schematically illustrating a channel setup method of the display apparatus according to an exemplary embodiment.

FIG. 3 is a flowchart schematically illustrating a channel setup method of the display apparatus according to an exemplary embodiment.

FIGS. 4 to 10 illustrates examples of the channel setup method of the display apparatus according to the exemplary embodiment.

In operation S301 (see FIG. 3), power and a coaxial cable are connected to the display apparatus 100.

A power cord is connected by the user to a power cord terminal (not shown) on the rear cover 13 of the display apparatus 100. A coaxial cable for broadcast reception is connected by the user to a coaxial cable connection terminal (not shown) protruding through the rear cover 13 of the display apparatus 100. Also, the coaxial cable may be connected to the display apparatus 100 through a coaxial cable connection terminal (not shown) in a connector electrically connected to the display apparatus 100. In the present embodiment, the term "user" refers to a person that sets up a configuration of the display apparatus through the initial setting screen on the display apparatus 100, including a user, an administrator and an installation engineer.

Figure 4:
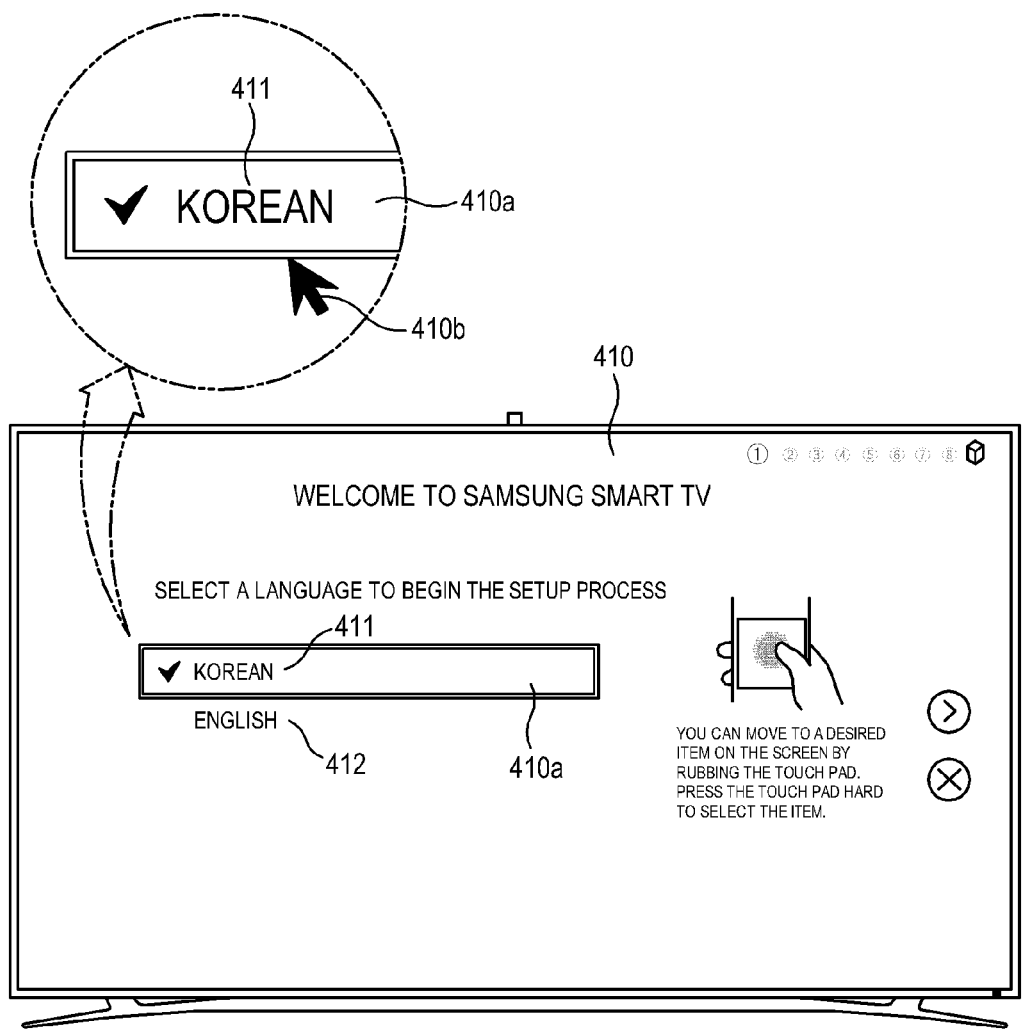
FIGS. 4 to 10 illustrates examples of the channel setup method of the display apparatus according to the exemplary embodiment.

Referring to FIG. 4, the controller 110 may determine, using the reference information stored in the storage unit, whether to supply power to the display apparatus 100 for the first time. Also, the controller 110 may determine whether to supply power for the first time with reference to existence of channel information stored in the storage unit 180. When no channel information is stored in the storage unit 180, the controller 110 determines to supply power for the first time.

When power is supplied for the first time, the controller 110 may display a first initial setting screen 410 for initially setting the display apparatus 100 on the display unit 170. The initial setting screen pre-stored in the storage unit 180 and displayed may include a plurality of screens. The first initial setting screen 410 displayed on the display unit 170 is a first screen of the initial setting screen.

On the first initial setting screen 410, one (for example, Korean 411) of a plurality of displayed languages, for example, Korean 411 and English 412 may be selected by the user. For instance, a language to be used for the display apparatus 100 may be selected (for example, be divided or separated as an activated or activatable region 410*a*) using a direction key, a confirmation key or a touch on the touch pad on the remote controller 200. When a touch pad, joystick, trackball or direction key on the remote controller 200 is selected, a pointer 410*b* may be displayed on the first initial setting screen 410. Further, the pointer 410*b* may be displayed along with the activated region 410*a* on the first initial setting screen 410.

The language to be used for the display apparatus 100 may be selected using the panel key 14 of the rear cover 13.

In operation S302 (see FIG. 3), a channel retrieval request is received.

Figure 5:
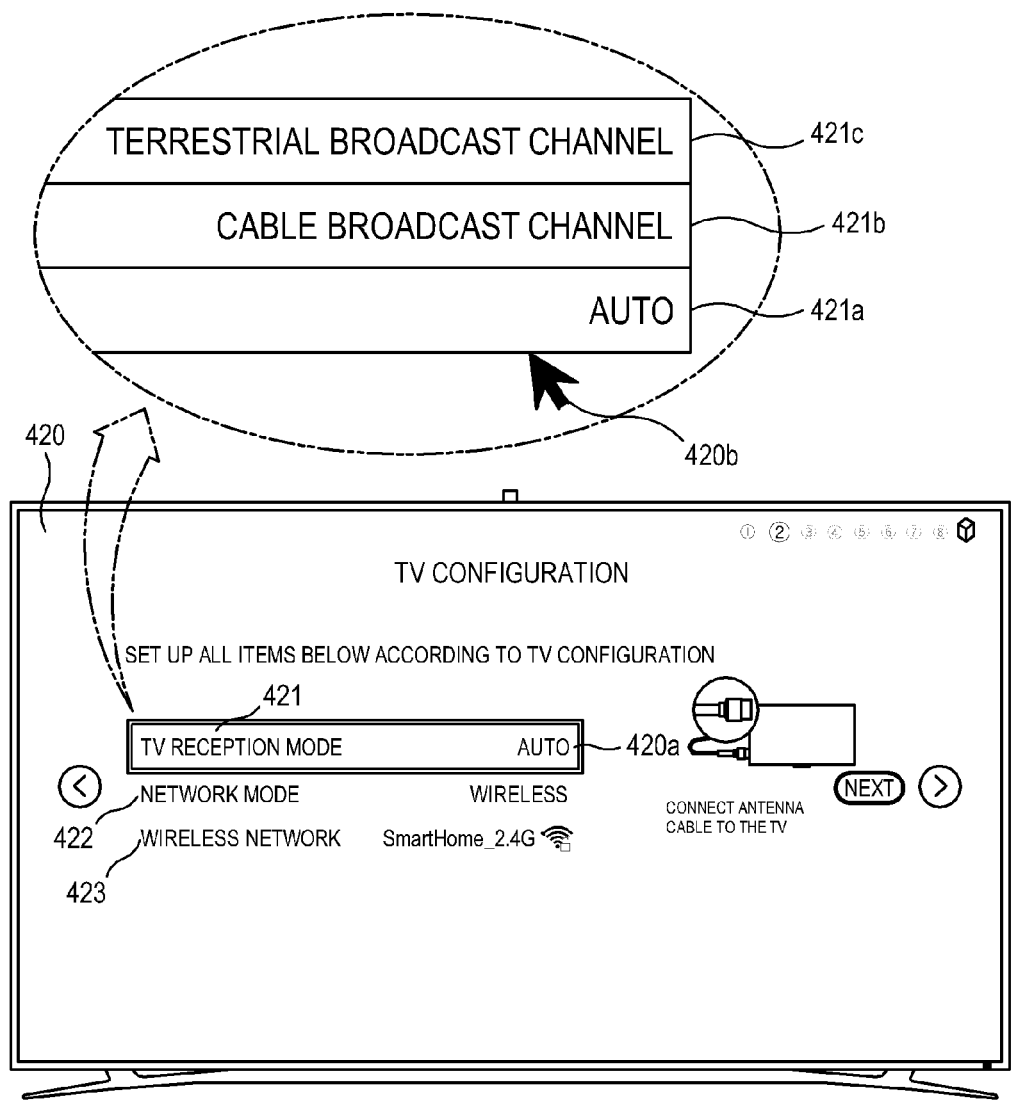

Referring to FIG. 5, the controller 110 displays a second initial setting screen 420. The user may set up a configuration of the display apparatus 100 through the second setting screen 420.

The controller 110 may display the second initial setting screen 420 in the language selected on the first initial setting screen 410 on the display unit 170. A TV reception mode 421 on the second initial setting screen 420 may be displayed as Auto 421*a* as a default. Auto 421*a* of the TV reception mode 421 means that the display apparatus 100 automatically determines whether the coaxial cable connected to the coaxial cable connection terminal is a coaxial cable for the terrestrial broadcasting mode or a coaxial cable for the cable broadcasting mode.

When the TV reception mode 421 is Auto 421*a*, the second initial setting screen 420 is displayed on the display unit 170 and channel retrieval is automatically conducted after a predetermined time, for example, 1 second. When there is no user input through one of the remote controller 200 and the panel key 14 for the predetermined time, the controller 110 may determine that an automatic channel retrieval request is received. Further, the controller 110 may receive a channel retrieval request corresponding to a selection of one of the cable broadcasting mode 421*b* and the terrestrial broadcasting mode 421*c* of the TV reception mode 421.

The controller 110 may receive a channel retrieval request through a voice recognition function, for example, using the microphone 140 and the voice recognition module, corresponding to a voice uttered by the user. Also, the controller 110 may receive a channel retrieval request through a motion recognition function, for example, using the camera 145 and the motion recognition module, corresponding to a motion of the user.

In operation S303 (see FIG. 3), a determined frequency band is retrieved.

Figure 6:
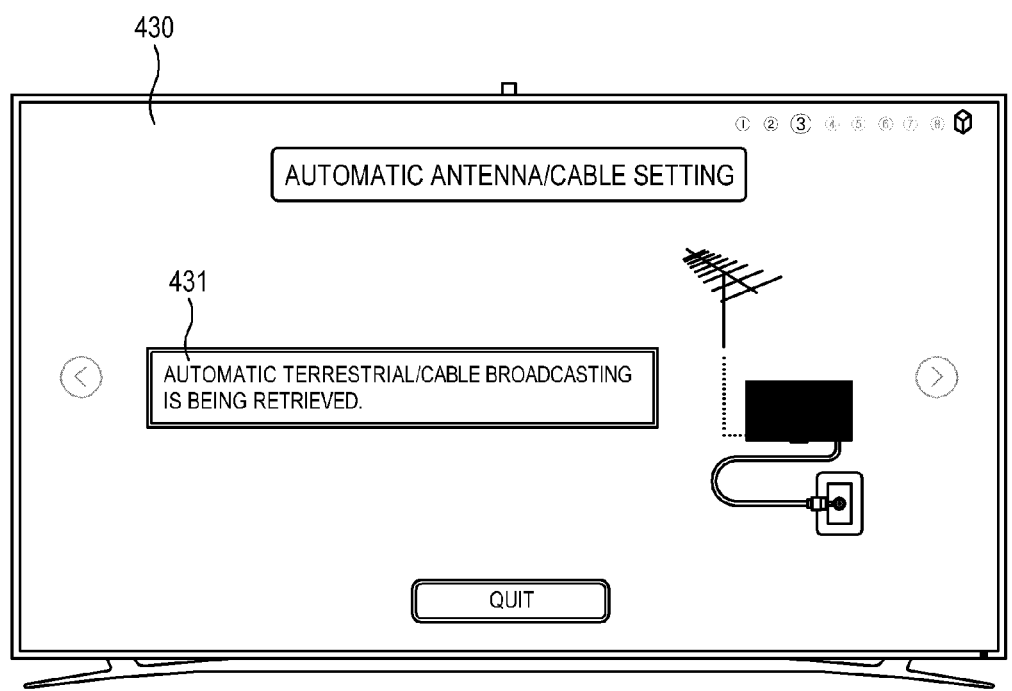

Referring to FIG. 6, the controller 110 displays a third initial setting screen 430 on the display unit 170. The controller 110 may retrieve a determined frequency band through the tuner 120 in response to the received channel retrieval request, for example, Auto 420*a*. The controller 110 may retrieve a channel using a frequency band corresponding to the terrestrial broadcasting mode and a frequency band corresponding to the cable broadcasting mode pre-stored in the storage unit. The third initial setting screen 430 may display "Terrestrial/cable broadcasting is automatically being retrieved" 431 in response to the channel retrieval request. The controller 110 may retrieve or scan a corresponding frequency band changing a channel number up from channel number 1 or retrieve a corresponding frequency band changing a channel number down to channel number 1.

In the present embodiment, the controller 110 may preferentially retrieve frequency bands which are different with respect to the same channel number in the terrestrial broadcasting mode and in the cable broadcasting mode.

For example, in the NTSC broadcast system, regarding channel number 14, a frequency band of the terrestrial broadcasting mode ranges from 470 to 476 MHz and a center frequency is 473 MHz. A frequency band of the cable broadcasting mode ranges from 120 to 126 MHz and a center frequency is 123 MHz. Frequency bands corresponding to channel numbers 2 to 13 in the terrestrial broadcasting mode are the same as those in the cable broadcasting mode.

It should be understood by a person skilled in the art that the controller 110 preferentially retrieves frequency bands which are different with respect to the same channel number, for example, channel number 14, in the terrestrial broadcasting mode and in the cable broadcasting mode to reduce time to retrieve a channel.

The NTSC broadcast system are adopted by dozens of countries of the world, in which different broadcast channels and different frequency bands may be used for the respective countries. For instance, in Japan, a frequency band of the terrestrial broadcasting mode and a frequency band of the cable broadcasting mode are different with respect to channel number 13. Regarding channel number 13, the frequency band of the terrestrial broadcasting mode may range 470 to 476 MHz and a center frequency may be 473 MHz. The frequency band of the cable broadcasting mode may range from 108 to 114 MHz and a center frequency may be 111 MHz. In Japan, the frequency band of the terrestrial broadcasting mode and the frequency band of the cable broadcasting mode with respect to channel number 13 may be retrieved first, resulting in a decrease in time to retrieve a channel, which should be understood by a person skilled in the art.

Table 1 shows illustrative examples of channel numbers, frequency bands of the terrestrial broadcasting mode and frequency bands of the cable broadcasting in the NTSC broadcast system.

TABLE 1

| Channel No. | Frequency band (MHz) | |
|---|---|---|
| | Terrestrial broadcasting | Cable broadcasting |
| 2 | 57 | 57 |
| 3 | 63 | 63 |
| 4 | 69 | 69 |
| 5 | 79 | 79 |
| 6 | 85 | 85 |
| 7 | 177 | 177 |
| 8 | 183 | 183 |
| 9 | 189 | 189 |
| 10 | 195 | 195 |
| 11 | 201 | 201 |
| 12 | 207 | 207 |
| 13 | 213 | 213 |
| 14 | 473 | 123 |
| 15 | 479 | 129 |
| 16 | 485 | 135 |
| 17 | 491 | 141 |
| 18 | 497 | 147 |
| 19 | 503 | 153 |
| 20 | 509 | 159 |
| ... | ... | ... |
| 80 | 869 | 561 |
| 81 | 875 | 567 |
| 82 | 881 | 573 |
| 83 | 887 | 579 |

In the PAL broadcast system according to another exemplary embodiment, the controller 110 may preferentially retrieve channel numbers corresponding to the same frequency band, unlike the NTSC broadcast system. For example, when a frequency band ranges 470 to 478 MHz and a center frequency is 474 MHz, the controller 110 may verify that a channel number is 21 in the terrestrial broadcasting mode and 47 in the cable broadcasting mode. It should be understood by a person skilled in the art that the controller 110 preferentially retrieves channel numbers corresponding to the same frequency band, for example, 470 to 478 MHz, to reduce time to retrieve a channel.

It should be understood by a person skilled in the art that the controller 110 preferentially retrieves frequency bands of the terrestrial broadcasting mode and the cable broadcasting mode with respect to the same channel number, for example, channel number 21, to reduce time to retrieve a channel.

In the PAL broadcast system, like in the NTSC broadcast system, different broadcast channels and different frequency bands may be used by countries. Channel numbers corresponding to the same frequency band may be retrieved first depending on countries. Alternatively, frequency bands of the terrestrial broadcasting and the cable broadcasting corresponding to the same channel number may be retrieved first depending on counties.

Table 2 shows illustrative examples of channel numbers, frequency bands of the terrestrial broadcasting mode and frequency bands of the cable broadcasting in the PAL broadcast system.

TABLE 2

| Channel No. | Frequency band (MHz) | |
|---|---|---|
| | Terrestrial broadcasting | Cable broadcasting |
| 1 | — | 114 |
| 2 | — | 122 |
| 3 | — | 130 |
| 4 | — | 138 |
| 5 | — | 146 |
| 6 | — | 154 |
| 7 | — | 162 |
| 8 | — | 170 |
| 9 | — | 177.5 |
| 10 | — | 184.5 |
| 11 | — | 191.5 |
| 12 | — | 198.5 |
| 13 | — | 205.5 |
| 14 | — | 212.5 |
| 15 | — | 219.5 |
| 16 | — | 226.5 |
| 17 | — | 234 |
| 18 | — | 242 |
| 19 | — | 250 |
| 20 | — | 258 |
| 21 | 474 | 266 |
| 22 | 482 | 274 |
| 23 | 490 | 282 |
| 24 | 498 | 290 |
| 25 | 506 | 298 |
| 26 | 514 | 306 |
| 27 | 522 | 314 |
| 28 | 530 | 322 |
| 29 | 538 | 330 |
| 30 | 546 | 338 |
| 31 | 554 | 346 |
| 32 | 562 | 354 |
| 33 | 570 | 362 |
| 34 | 578 | 370 |
| 35 | 586 | 378 |
| 36 | 594 | 386 |
| 37 | 602 | 394 |
| 38 | 610 | 402 |
| 39 | 618 | 410 |
| 40 | 626 | 418 |
| 41 | 634 | 426 |
| 42 | 642 | 434 |
| 43 | 650 | 442 |
| 44 | 658 | 450 |

TABLE 2-continued

| | Frequency band (MHz) | |
|---|---|---|
| Channel No. | Terrestrial broadcasting | Cable broadcasting |
| 45 | 666 | 458 |
| 46 | 674 | 466 |
| 47 | 682 | 474 |
| 48 | 690 | 482 |
| 49 | 698 | 490 |
| 50 | 706 | 498 |
| Etc. | Etc. | Etc. |

Similarly to the NTSC and PAL broadcast systems, the SECAM broadcast system is adopted by dozens of countries of the world, in which different broadcast channels and different frequency bands may be used for the respective countries. Channel numbers corresponding to the same frequency band may be retrieved first depending on countries. Alternatively, frequency bands of the terrestrial broadcasting and the cable broadcasting corresponding to the same channel number may be retrieved first depending on counties.

It should be understood by a person skilled in the art that a frequency band of the terrestrial broadcasting and a frequency band of the cable broadcasting corresponding to a broadcast channel may be retrieved in the SECAM broadcast system.

In operations S304 (see FIG. 3), the display apparatus 100 determines whether the frequency band is 123 MHz.

Figure 7:
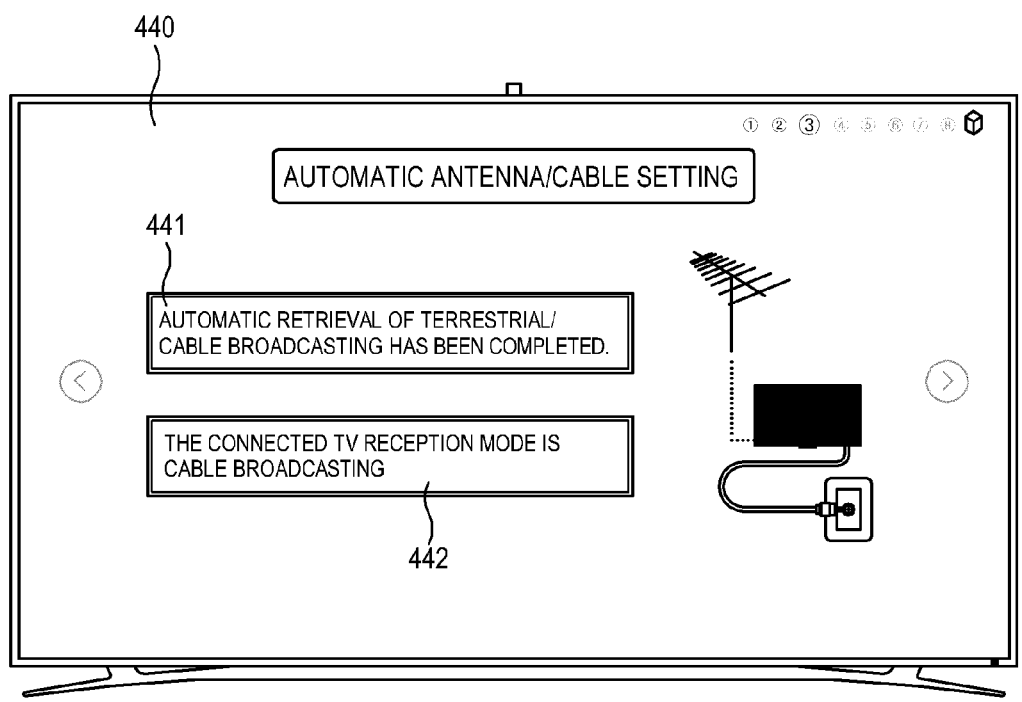

Referring to FIG. 7, the controller 110 displays a fourth initial setting screen 440 on the display unit 170.

The controller 110 may display "Automatic retrieval of terrestrial/cable broadcasting has been completed" 441 on the fourth initial setting screen 440. The controller 110 may display "The connected TV reception mode is cable broadcasting" 442 on the fourth initial setting screen 440 in response to a channel/frequency retrieval result.

The controller 110 may determine one of the terrestrial broadcasting mode and the cable broadcasting mode in response to a retrieval result of frequency bands corresponding to the same channel. For example, the controller 110 may retrieve frequency bands corresponding to channel number 14. The controller 110 may preferentially retrieve a frequency band ranging from 120 to 126 MHz. When a center frequency of the retrieved frequency band is 123 MHz, the controller 110 determines that the coaxial cable for cable broadcasting is electrically connected to the tuner 120.

Alternatively, the controller 110 may preferentially retrieve a frequency band ranging from 470 to 476 MHz. When a center frequency of the retrieved frequency band is 473 MHz, the controller 110 determines that the coaxial cable for terrestrial broadcasting is electrically connected to the tuner 120.

According to another exemplary embodiment, the controller 110 may determine by verifying a channel number whether the terrestrial broadcasting mode or the cable broadcasting mode is performed.

The controller may determine whether the terrestrial broadcasting mode or the cable broadcasting mode is performed through frequency bands of the terrestrial broadcasting mode and the cable broadcasting mode with respect to the same channel number, for example, channel number 21. For instance, a frequency band of the terrestrial broadcasting mode corresponding to channel number 21 may range 470 to 478 MHz, while a frequency band of the cable broadcasting mode corresponding to the same may range 262 to 270 MHz.

The controller 110 may determine one of the terrestrial broadcasting and the cable broadcasting in response to a retrieval result of channels corresponding to the same frequency band.

In another exemplary embodiment, the controller 110 may determine one of the terrestrial broadcasting mode and the cable broadcasting mode in response to a retrieval result of channel numbers corresponding to the same frequency band. When channel number 21 corresponds to the frequency band, for example, ranging from 470 to 478 MHz, the controller 110 determines that the coaxial cable for terrestrial broadcasting is electrically connected to the tuner 120.

Alternatively, when channel number 47 corresponds to the frequency band, for example, ranging from 470 to 478 MHz, the controller 110 determines that the coaxial cable for cable broadcasting is electrically connected to the tuner 120.

The controller 110 may determine one of the terrestrial broadcasting and the cable broadcasting in response to a retrieval result of channels corresponding to the same frequency band.

In operation S304, when the retrieved frequency band ranges from 120 to 126 MHz, operation S305 is carried out (see FIG. 3).

In operation S305, the display apparatus 100 retrieves the cable broadcasting mode.

Figure 8:
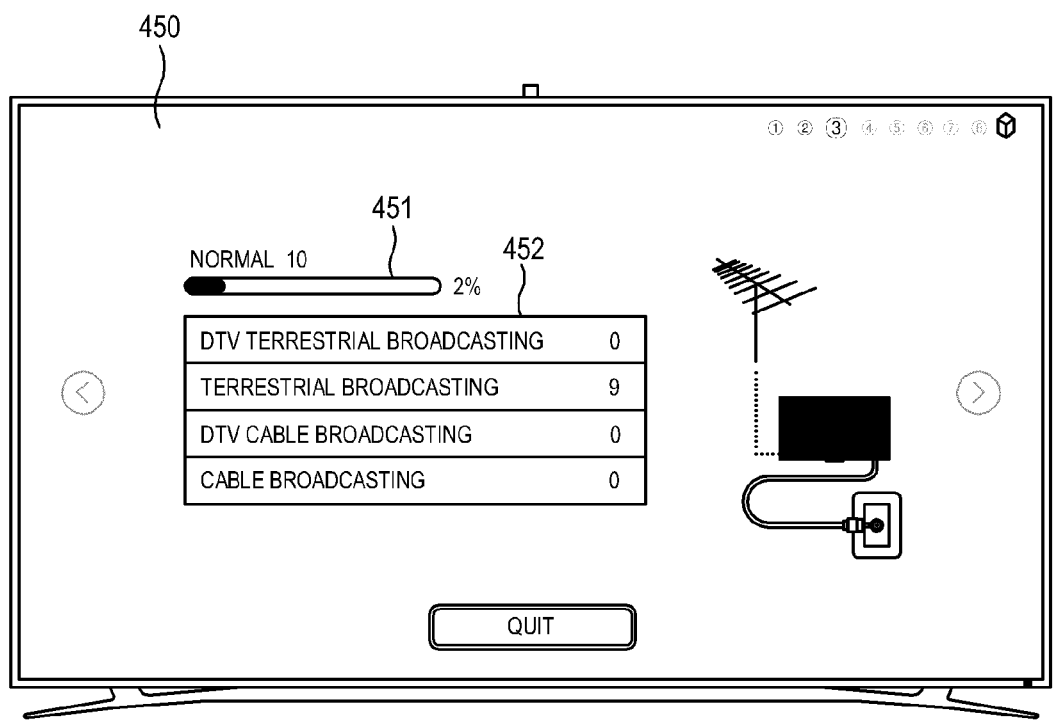
Figure 9:
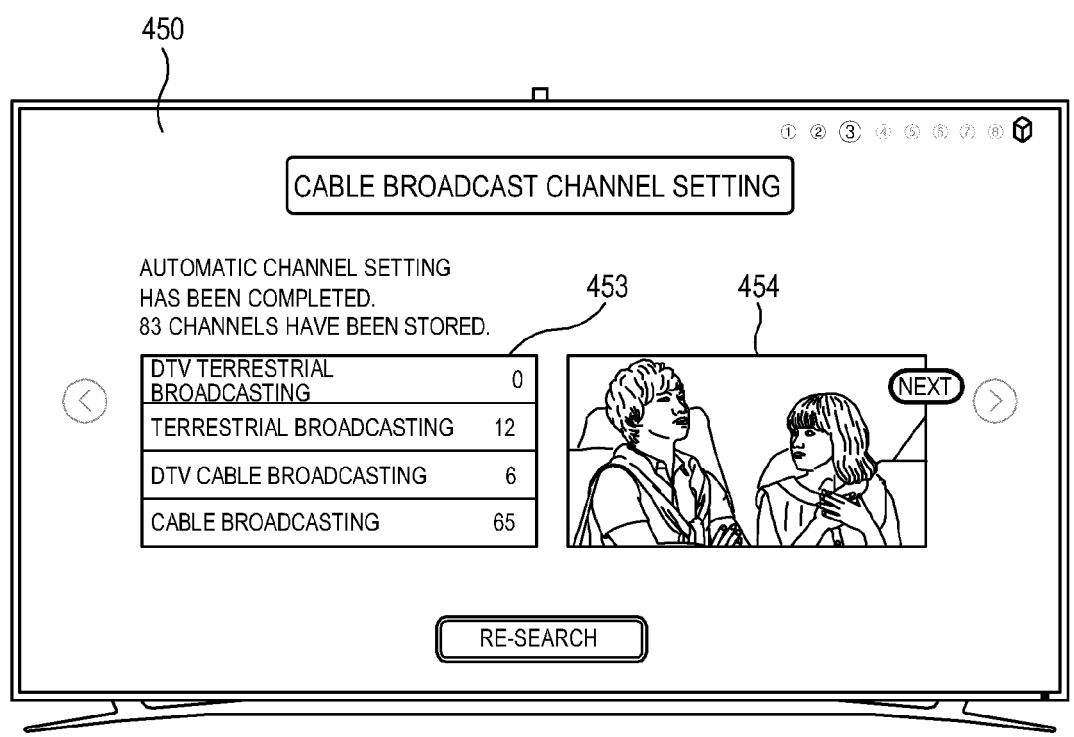

Referring to FIGS. 8 and 9, the controller 110 displays a fifth initial setting screen 450. The controller 110 may retrieve a channel of the cable broadcasting mode corresponding to a retrieval result, for example, that the retrieved frequency band ranges from 120 to 126 MHz and a center frequency is 123 MHz.

A progress bar 451 presenting progression of channel retrieval of the cable broadcasting mode is displayed on the fifth initial setting screen 450. A channel count 452 corresponding to the progression of the channel retrieval of the cable broadcasting mode is displayed on the fifty initial setting screen 450. For example, when the progression of the channel retrieval of the cable broadcasting mode is 10%, nine channels of the terrestrial broadcasting mode are retrieved.

When the channel retrieval of the cable broadcasting mode is completed, a total retrieved channel count 453, for example, 83 channels, may be displayed. Also, a selected broadcast channel, for example, channel number 11, among the retrieved channels may be displayed on the fifth initial setting screen 450 in a smaller size than the display unit 170, for example, 20 to 30% of the size of the display unit 170.

In operation S306 (see FIG. 3), retrieved channels of the cable broadcasting mode are stored.

The controller 110 may store the retrieved channels of the cable broadcasting mode, for example, 83 channels, in the storage unit 180 as channel information. The controller 110 may change to another channel on a channel change request received through the channel key and touch panel of the external remote controller 200 using a channel list of the cable broadcasting mode (not shown) stored in the storage unit. Also, the controller 100 may change to another channel on a channel change request received through the panel key 14, a voice and a motion.

Not only when power is supplied for the first time but also when the coaxial cable is separated and is connected again by the user, the controller 110 may display the first initial setting screen of FIG. 4 to conduct channel retrieval. Further, not only when power is supplied for the first time but also when the coaxial cable is separated and is connected again by the user, the controller 110 may display the first initial setting screen of FIG. 4 only by a user input.

In one exemplary embodiment, when the coaxial cable for the terrestrial broadcasting mode is connected and the cable broadcasting mode 421b is selected by the user, the controller 110 may retrieve the determined frequency band to determine that the terrestrial broadcasting mode is set, not the cable broadcasting mode, and set up and store a channel of the terrestrial broadcasting mode.

Alternatively, when the coaxial cable for the cable broadcasting mode is connected and the terrestrial broadcasting mode 421c is selected by the user, the controller 110 may retrieve the determined frequency band to determine that the cable broadcasting mode is set, not the terrestrial broadcasting mode, and set up and store a channel of the cable broadcasting mode.

When the cable broadcasting mode retrieved in operation S306 is stored in the storage unit 180, the channel setup method of the display apparatus ends.

Returning to operation S304, when the retrieved frequency band does not range from 120 to 126 MHz, operation S307 is carried out.

In operation S307 (see FIG. 3), the display apparatus 100 retrieves the terrestrial broadcasting mode.

Figure 10:
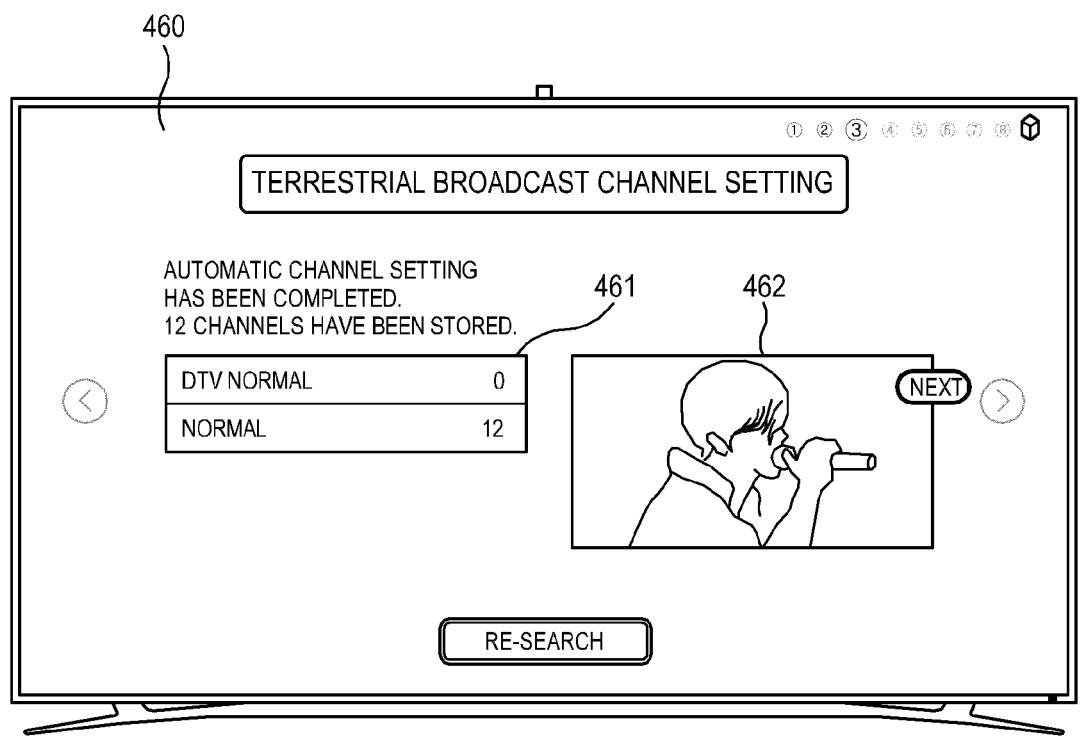

Referring to FIG. 10, the controller 110 displays a sixth initial setting screen 460. The controller 110 may retrieve a channel of the terrestrial broadcasting mode corresponding to a retrieval result, for example, that the retrieved frequency band ranges from 470 to 476 MHz and a center frequency is 473 MHz.

The sixth initial setting screen 460 may display progression of channel retrieval of the terrestrial broadcasting mode. When the channel retrieval of the terrestrial broadcasting mode is completed, a total retrieved channel count 461, for example, 12 channels, may be displayed. Also, a selected broadcast channel, for example among the retrieved channels may be displayed on the sixth initial setting screen 460 in a smaller size than the display unit 170, for example, 20 to 30% of the size of the display unit 170.

When retrieval of the terrestrial broadcasting mode is completed in operation S307, operation S306 is carried out.

When the terrestrial broadcasting mode retrieved in operation S306 is stored in the storage unit 180, the channel setup method of the display apparatus ends.

The methods according to the above-described exemplary embodiments may be recorded in computer-readable media including program instructions to implement various operations embodied by a computer. The media may also include, alone or in combination with the program instructions, data files, data structures, and the like. Examples of computer-readable media include volatile or nonvolatile storage devices such as ROMs, memories such as RAMs, memory chips and devices or integrated circuits, or storage media magnetically or optically recordable and readable by a machine, for example, a computer, such as CDs, DVDs, magnetic disks or magnetic tapes regardless of deletion or re-recording capabilities. A memory which can be included in a mobile terminal is a type of storage medium readable by a machine appropriate to store programs including instructions to implement the exemplary embodiments. The program instructions recorded in the media may be designed and configured specially for the exemplary embodiments or be known and available to those skilled in computer software.

While a few exemplary embodiments have been shown and described with reference to the accompanying drawings, it will be apparent to those skilled in the art that various modifications and variations can be made from the foregoing descriptions.

Thus, other implementations, alternative embodiments and equivalents to the claimed subject matter are construed as being within the appended claims.

What is claimed is:

1. A channel setup method of a display apparatus, the method comprising:
   receiving a channel retrieval request on a setting screen displayed on the display apparatus;
   retrieving a determined frequency band corresponding to the received channel retrieval request to produce a retrieval result; and
   selecting one of a terrestrial broadcasting mode and a cable broadcasting mode in response to the retrieval result,
   wherein the retrieving a determined frequency band comprises determining whether a center frequency of the determined frequency band corresponds to the received channel.

2. The method of claim 1, wherein the receiving the channel retrieval request comprises receiving the request from one of a touch pad on a remote controller, a key on the remote controller, a touch screen on the display apparatus and a panel key on the display apparatus.

3. The method of claim 1, wherein a frequency band of the terrestrial broadcasting mode and a frequency band of the cable broadcasting mode corresponding to a same channel number are different.

4. The method of claim 1, further comprising setting up a broadcast channel of one of the terrestrial broadcasting mode and the cable broadcasting mode in response to a channel selection.

5. The method of claim 4, further comprising storing the set up broadcast channel.

6. The method of claim 1, further comprising determining whether to supply power to the display apparatus for a first time, wherein the determining whether to supply power to the display apparatus is conducted using reference information pre-stored in a storage unit.

7. The method of claim 1, wherein the broadcasting signal is received from one of an analog broadcasting system and a digital broadcasting system.

8. A display apparatus, comprising:
   a display to display an initial setting screen;
   a tuner; and
   a controller to control the display and the tuner,
   wherein the controller controls to electrically connect a power cord and a coaxial cable for broadcasting to the display apparatus, to connect the coaxial cable to the tuner, to retrieve a determined frequency band in response to a received channel retrieval request, and to display a set channel of a selected one of a terrestrial broadcasting mode and a cable broadcasting mode based on the initial setting screen,
   wherein controller controls to determine whether a center frequency of the determined frequency band corresponds to the received channel.

9. The display apparatus of claim 8, further comprising a storage unit, wherein the controller stores channel information corresponding to the set channel in the storage unit.

10. The display apparatus of claim 8, wherein the coaxial cable for broadcasting is electrically connected via one of a connection to the tuner and a connection using a separate connector connected to the tuner.

11. A method, comprising:
receiving a channel request;
retrieving both a terrestrial frequency band for a terrestrial broadcasting mode and a cable frequency band for a cable broadcasting mode when a channel number of the channel request is a same in both a terrestrial broadcasting mode and a cable broadcasting mode; and
selectively retrieving one of the terrestrial frequency band for the terrestrial broadcasting mode and the cable frequency band for the cable broadcasting mode when a channel number of the channel request is not the same in both a terrestrial broadcasting mode and a cable broadcasting mode,
wherein the retrieving both a terrestrial frequency band comprises determining whether a center frequency of the terrestrial frequency band corresponds to the received channel.

12. A method, comprising:
receiving a broadcasting signal through a cable, wherein the broadcasting signal has a first frequency band where a frequency band of a terrestrial broadcasting mode and a frequency band of a cable broadcasting mode corresponding to a first channel is same and a second frequency band where a frequency band of the terrestrial broadcasting mode and a frequency band of the cable broadcasting mode corresponding to a second channel is different;
determining whether one of the frequency band of the terrestrial broadcasting mode and the frequency band of the cable broadcasting mode corresponding to the second channel within the second frequency band is retrieved responsive to a mode setup request; and
setting one of the terrestrial broadcasting mode and the cable broadcasting mode responsive to the retrieved one of the frequency band of the terrestrial broadcasting mode and the frequency band of the cable broadcasting mode.

13. A method as recited in claim 12,
wherein when the mode setup request is produced a user selectable selection list is displayed on a display with the list comprising a terrestrial broadcast channel entry, a cable broadcast channel entry and an automatic selection entry.

14. A method as recited in claim 12, wherein when the frequency band corresponds to a first band, the cable broadcasting mode is set and when the frequency band corresponds to a second band the terrestrial broadcasting mode is set.

15. A method as recited in claim 12, wherein when the mode setup request requests a predetermined channel a corresponding one of the terrestrial broadcasting mode and the cable broadcasting mode is set.

16. A method as recited in claim 12, wherein a stored correspondence between a channel, a frequency band and modes comprising the terrestrial broadcasting mode and the cable broadcasting mode is selectively used to determine the mode.

17. A non-transitory computer readable storage storing a process for controlling a processor, the process comprising:
receiving a broadcasting signal through a cable, wherein the broadcasting signal has a first frequency band where a frequency band of a terrestrial broadcasting mode and a frequency band of a cable broadcasting mode corresponding to a first channel is same and a second frequency band where a frequency band of the terrestrial broadcasting mode and a frequency band of the cable broadcasting mode corresponding to a second channel is different;
determining whether one of the frequency band of the terrestrial broadcasting mode and the frequency band of the cable broadcasting mode corresponding to the second channel within the second frequency band is retrieved responsive to a mode setup request; and
setting one of the terrestrial broadcasting mode and the cable broadcasting mode responsive to the retrieved one of the frequency band of the terrestrial broadcasting mode and the frequency band of the cable broadcasting mode.

* * * * *